US007016868B1

(12) United States Patent
McIntyre et al.

(10) Patent No.: US 7,016,868 B1
(45) Date of Patent: Mar. 21, 2006

(54) METHOD AND SYSTEM FOR ORGANIZING IMAGES

(75) Inventors: Dale F. McIntyre, Honeoye Falls, NY (US); Joseph A. Manico, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/470,216

(22) Filed: Dec. 22, 1999

(51) Int. Cl.
*G06F 17/60* (2006.01)

(52) U.S. Cl. .......................................... 705/27; 705/26

(58) Field of Classification Search ............. 705/26–27
See application file for complete search history.

(56) References Cited

U.S. PATENT DOCUMENTS

| 5,020,669 | A | * | 6/1991 | Nakagoshi ................... 206/466 |
| 5,159,385 | A | | 10/1992 | Imamura |
| 5,666,215 | A | | 9/1997 | Fredlund et al. |
| 5,764,972 | A | * | 6/1998 | Crouse et al. ................... 707/1 |
| 5,974,401 | A | | 10/1999 | Enomoto et al. |
| 6,155,025 | A | * | 12/2000 | Komiya et al. ................ 53/147 |
| 6,273,986 | B1 | * | 8/2001 | Egan ........................... 156/277 |
| 6,324,521 | B1 | * | 11/2001 | Shiota et al. .................. 705/27 |
| 6,324,545 | B1 | * | 11/2001 | Morag ........................ 707/202 |

FOREIGN PATENT DOCUMENTS

| EP | 0 858 207 | 8/1998 |
| EP | 0 878 956 | 11/1998 |
| EP | 0 930 774 | 7/1999 |

OTHER PUBLICATIONS

Canada Newswire, "London Drugs Pioneers One Hour Photo Finishing Uploaded To The Internet," Nov. 27, 1998, Dialog file 20 #03585033.*
Symons, "Trailblazer London Drug Serves Up Internet Café, Photo Station," Drug Store News, Oct. 19, 1998, p83(1), Dialog file 570 #01698687.*
Florida Times Union, "New Development: Web Photos," Aug. 9, 1998, Proquest.*
"Archiving," U.S. News & World Report, "A Photo Lab On Your Desk," Nov. 25, 1996, v121n21p24, ISSN# 00415537.*
"Archiving," PR Newswire, "Live Picture And Laboratories Fujifilm France Debut New Consumer Services For Processing, Printing And Publishing Photos Online," Sep. 17, 1998, Proquest.*
"Archiving," Corporate EFT Report, "Payroll Service Office Boosts Customer Service With COLD," Oct. 15, 1997, n17n19p4, ISSN# 02720299, Proquest.*
"Archiving," Copyright Office Systems Magazine Corporation, "Scan It, Save It, Store It On CD," Nov. 1997, v14n11p59, ISSN #87503441, Proquest.*

(Continued)

Primary Examiner—Robert M. Pond
(74) Attorney, Agent, or Firm—Frank Pincelli

(57) ABSTRACT

A system and method for organizing images obtained from at least one image retaining device having a unique identification. The system includes a computer having a database for storing digital images and a management section for managing customer orders and stored digital images. The management section is capable of receiving and storing a unique identification of at least one image retaining device and registering the image retaining device to a customer account. After reaching a predetermined period of time or number of images obtained from image sources, the system automatically provides a product and/or service to a recipient designated by the customer incorporating the plurality of customer provided images.

15 Claims, 13 Drawing Sheets

OTHER PUBLICATIONS

"Archiving," Rocky Mountain News, "Picture Perfect Photonet Puts Snapshots In Digital Form For Online Use," Aug. 3, 1998, Proquest.*

PhotoNet: Internet Archive Wayback Machine, www.archive.org; www.photonet.com; Jul. 1, 1998; May 9, 1998, May 15, 1998, May 19, 1998, May 22, 1998, Jul. 9, 1998, Dec. 2, 1998; 17 total pages.*

Bloom, David; "Digital L.A.; Get the Picture More Companies Making the Photo-Computer Link," Daily News, Sep. 5, 1998, 4 pgs, Proquest #33742622.*

Lipton, Gigi; "Product Traceability; A Guide for Locating Recalled Manufactured Goods," Quality Congress, 1998, 11 pgs, Proquest #36002572.*

Automatic ID News: "ID Cards Help the Australian Golf Union Cut (key) Strokes," Automatic ID News Asia, Apr. 1997, Dialog file 9 #1822754.*

UU: IPR: "CD-ROM Gaining Acceptance Among Processor, Technology Faces Tough Competition From Internet Distributio," Item Processing Report, Jun. 18, 1998, v9n12, pg1, 3 pgs, Proquest #33975235.*

* cited by examiner

REGISTER HERE...

LAST NAME  FIRST NAME —48

ADDRESS1  PHONE NUMBER —50

ADDRESS2 —49  EMAIL ADDRESS —52

CITY  STATE  ZIP CODE

FILM CARTRIDGE ID —56

REGISTRATION NUMBER —54

CREDIT CARD NUMBER

[CLICK HERE TO REGISTER MORE FILM]

www.kodak.com/reg.html

*FIG. 3a*

PLEASE VERIFY THAT YOUR INFORMATION IS CORRECT

DOE, JANE
123 SUBURBAN LANE
ANYTOWN, NY 12345

(111)222-3333
JDOE@ANYISP.COM

CONTINUE    GO BACK www.kodak.com/reg/addverify.html

*FIG. 3b*

PLEASE PRE-SELECT FINISHING SERVICES FOR YOUR
FILM # 000001234567

○ PRINTS BY MAIL     ○ DOUBLE
○ PRINTS AT RETAIL     ○ DOUBLE
○ ALBUM PAGES
○ PictureCD™
○ Kodak PhotoNet™
○ CREATE EVENT SITE
○ CREATE MY YEAR IN PICTURES
   ○ CD FULFILLMENT
   ○ ALBUM PAGE FULFILLMENT
○ I'LL DECIDE LATER...

[ NEXT ROLL ]    OR    [ ENTER FILM ID ]   [ GO TO ROLL ]

www.kodak.com/reg/services.html

FIG. 3d

METHOD AND SYSTEM FOR ORGANIZING IMAGES

CROSS REFERENCE TO RELATED APPLICATIONS

U.S. Ser. No. 09/470,938, filed Dec. 22, 1999, entitled "A KIT FOR ORGANIZING A PLURALITY OF IMAGES"

FIELD OF THE INVENTION

This invention relates to the field of image capture, and in particular to a system and method for organizing images obtained from a plurality of image retaining and/or capturing devices.

BACKGROUND OF THE INVENTION

Photographic services including image digitization, digital image storage and network access to digital image files and distribution of digital image files are currently provided by network photoservice providers such as the KODAK PhotoNet™ Online service available on the Internet at http://kodak.photonet.com. To use this system, the photographer checks a box on a photoprocessing envelope indicating she would like to receive this service. The photofinisher processes the film, scans the film to produce digital images, and uploads the digital images to the network photoservice provider via an FTP (file transfer protocol) site through an Internet server. The network photoservice provider receives the digital images and stores them as image files in a mass storage device such as a Sun ultra 250 mass storage hard drive connected to an internet server.

The network photoservice provider assigns the image file a roll ID number, and an OwnerKey which functions as a location indicator and password so that the photographer can access the image file over the Internet, and sends the roll ID number and OwnerKey back to the photofinisher. The photofinisher prints a receipt listing the roll ID number, and an OwnerKey and returns the receipt along with the printed photographs to the photographer.

The photographer then accesses the network photoservice provider from an Internet capable personal computer, supplying the network photoservice provider with her e-mail address, personal password, roll ID number and OwnerKey. The network photoservice provider then allows access to the stored images, from which photographer can download the images to the personal computer, authorize other people's access to the digital images by providing their e-mail addresses to the network photoservice provider, order reprints, specialty products, digitally manipulate images, and perform other functions. It will be readily appreciated that the entry of so many codes and addresses complicates the use of the services provided by the network photoservice provider. In addition there is no means for the photographer to check the processing status until the receipt with the roll ID, and an OwnerKey is received.

Additionally, a photographer may choose another digitization service such as the Kodak PictureCD™ product which provides pictures in digital form on a Compact Disc (CD). In this service, a single roll of film is processed, scanned and written to the PictureCD™. While other software is distributed on the PictureCD™, storing only the equivalent of a single roll of film on a CD doesn't begin to approach the capacity limits of this media.

There is a need for a simple method which allows a user to digitize many rolls of film over an extended period of time and have them automatically written to a single digital image storage device, such as a CD.

Furthermore, there is a need for such a system to interact with the user to eliminate pictures from the collection that were not desirable to keep. This need implies the a need for the storage of digitized pictures in a database related to a specifically identified user for a period of time, quantity of pictures, or amount of available credit that is monitored by the system.

In a traditional photofinishing operation, a customer brings an exposed undeveloped roll of film or ONE-Time-Use camera to a retail establishment for processing and printing. Typically, a single roll of film or ONE-Time-Use camera is provided for processing and printing. Even when more than one roll is provided for developing and printing they are first segregated into photoprocessing envelopes. There is no means for automatically coordinating images from one roll of film with that of another.

Another desirable feature of such a system according to the present invention is the ability to organize the digitized images into an organizational structure in part defined by non-picture data known as meta data which is associated with each individual picture.

Thus, there is a need to provide a method and system for organizing image orders and/or images for a particular customer. The present invention provides an improved method and system whereby images can be automatically and easily organized in accordance with pre-set parameters.

SUMMARY OF THE INVENTION

The foregoing and other objects, features and advantages of the invention will be apparent from the following more particular description of the preferred embodiment of the invention illustrated in the accompanying drawings.

In accordance with one aspect of the present invention there is provided a method for organizing a plurality of images obtained from a defined source, comprising the steps of:
  providing a database for storing digital images with respect to the customer account of a customer;
  providing at least one image that is stored on the database and associated with the customer account; and
  automatically providing a product for delivery to a recipient designated by the customer with respect to the at least one image stored on the database after reaching a predetermined criteria established prior to receipt of the images required to provide a product.

In accordance with another aspect of the present invention there is provided a system for organizing a plurality of images obtained from at least one image retaining device each having a unique ID, comprising:
  a computer having database for storing digital images associated with the customer account and a management section for managing customer orders with respect to the customer account of a customer and the stored digital images, the management section capable of receiving and storing the unique ID and registering the at least one image retaining device to the customer account, the computer associating a particular goods and/or services for delivery to a recipient designated by the customer to images obtained from the at least one image retaining device, prior to the receipt of the images required to provide the particular goods and/or services.

In accordance with yet another aspect of the present invention there is provided a method for organizing images obtained from a plurality of discrete image retaining devices with respect to the customer account of a customer, comprising the steps of:

provided a plurality of discrete image retaining devices, each having a unique ID;

obtaining the ID from each of the image retaining devices;

providing a first group of the image retaining devices;

forwarding the ID for each of the image retaining devices in the group to database of a network photoservice provider for storage prior to the network photoservice provider receiving the image retaining devices for association with the customer account for delivery to a recipient designated by the customer.

In accordance with still another aspect of the present invention there is provided a system for organizing images obtained from a group of a plurality discrete image retaining devices with respect to the customer account of a customer, each image retaining device having a unique ID, comprising:

a computer having database for storing digital images and a management section for managing customer orders and the stored digital images, the management section capable of receiving and storing the unique ID of the group of the plurality of image retaining devices and registering the group to a customer account, the computer associating a particular goods and/or services for delivery to a recipient designated by the customer to images obtained from the group of plurality of image retaining devices prior to receipt of the group of plurality of discreet image retaining devices required for fulfillment of the particular goods and/or services.

In accordance with another aspect of the present invention there is provided method for organizing a plurality of images obtained from an image source, comprising the steps of:

providing a database for storing of digital images;

providing a plurality of discrete image retaining devices in a package, each image retaining device having a unique ID;

forwarding the unique ID of the plurality of image retaining devices to a database at a network photoservice provider for storage;

allowing access to the database to a customer so as to allow registration of the plurality of image retaining devices to the customer prior to receipt of the plurality of image retaining devices by the photoservice provider.

In accordance with yet another aspect of the present invention there is provided a method for organizing images obtained from a plurality of discrete image retaining devices, each image retaining device have an unique ID, comprising the steps of:

obtaining the ID of a plurality of the image retaining devices and forwarding the ID to a database at network photoservice provider;

accessing the database by a customer and registering at least one of the image retaining devices to the customer, and the customer associating the providing of a goods or service for delivery to a recipient designated by the customer with respect to images obtained from the at least one image retaining device prior to receipt of the at least one image retaining device required for the providing of the goods and/or services.

In accordance with another aspect of the present invention there is provided a method for organizing a plurality of images obtained from an image source, comprising the steps of:

providing a database for storing of digital images;

providing a plurality of discrete image retaining devices in a package, each image retaining device having an unique ID, the package having a unique package ID;

forwarding the unique ID of the plurality of image retaining devices and the package ID to a database at a network photoservice provider for storage;

allowing access to the database to a customer so as to allow registration of the package ID so that the plurality of image retaining devices are automatically registered to the customer prior to receipt of the discreet image retaining devices by the network photoservice provider for delivery if goods and/or services to a recipient designated by the customer.

In still another aspect of the present invention there is provided a method for organizing a plurality of images obtained from a plurality strips of photographic film, each of the plurality of strips of film being provided in a discrete film cartridge, each of the plurality of strips photographic film having an unique ID recorded thereon, comprising the steps of:

providing a plurality of the film cartridges in a single package, the package having an unique package ID;

forwarding the unique ID for the plurality of strips of photographic film and package ID to a database at network photoservice provider for storage; and allowing access to the database to a customer so as allow registration of the package ID so that the plurality of strips of photographic film are automatically registered to the customer prior to receipt of the plurality of strips of photographic film by the network photoservice provider for delivery of goods and/or services to a recipient designated by the customer.

In still yet another aspect of the present invention there is provided a system for organizing a plurality of images obtained from a plurality strips of photographic film, each of the plurality of strips of film being provided in a discrete film cartridge, each of the plurality of strips photographic film having an unique ID recorded thereon, comprising:

a computer having database for storing digital images and a management section for managing customer orders and the stored digital images, the management section capable of receiving and storing the unique ID of the group of the plurality strips of photographic film and registering the plurality strips of photographic film to a customer using the unique ID prior to receipt of said plurality of strips of photographic film required for fulfilling of the customer orders for delivery of goods and/or services to a recipient designated by the customer.

In still another aspect of the present invention there is provided a method for organizing images obtained from a at least one image retaining device, comprising the steps of:

providing at least one image retaining devices having a unique ID;

obtaining the ID from each of the at least one image retaining device; and forwarding the ID for the at least one image retaining device to a network photoservice provider for association with the customer account prior to receipt of the at least one image retaining device for delivery of goods and/or services to a recipient designated by the customer.

BRIEF DESCRIPTION OF THE DRAWINGS

In the detailed description of the preferred embodiments of the invention presented below, reference is made to the accompanying drawings in which:

FIG. 3a is a diagram of registration screen on a display device of a computer that is used in the system of FIG. 2;

FIG. 3b is a diagram of a verification screen on a display device of a computer that is used in the system of FIG. 2;

FIG. 3d is a diagram of an order confirmation/verification screen on a display device of a computer used in the system of FIG. 2;

DETAILED DESCRIPTION OF THE INVENTION

Figure 1:
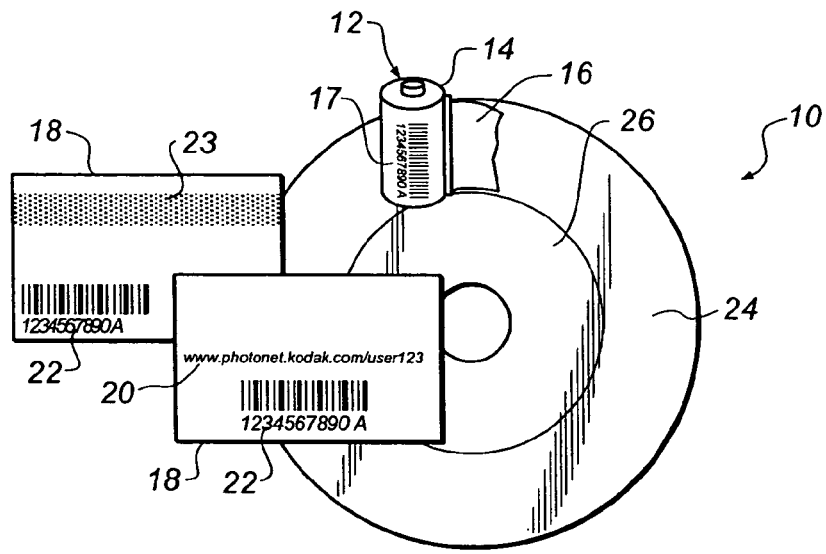
FIG. 1 is schematic diagram of a kit made in accordance with the present invention.

Referring to FIG. 1 there is illustrated a retail kit 10 made in accordance with the present invention, which can be used for organizing images for a customer. In particular, the kit 10 comprises an image retaining device 12 upon which images may be captured. In the particular embodiment illustrated, the image retaining device 12 comprises a film cartridge 14 containing a strip of photographic film 16 therein upon which images can be captured. The film cartridge 14 is provided with a unique cartridge ID 17 which in the embodiment illustrated is provided in machine readable and human readable form. Once the images have been captured on film 16, the film 16 can be then sent to a photofinisher 68 where the film 16 is developed and the developed images are digitally scanned and sent to an appropriate output device such as a printer for printing of hard copy prints. Alternatively or in addition thereto, the digitally captured images may be sent to an image database or storage bank as discussed later herein. The kit 10 further includes registration card 18 which can be used for identifying the purchasing customer. The registration card 18 can also be used to identify the goods and/or service to be provided as a result of the purchase of kit 10. In the particular embodiment illustrated the registration card 18 includes a universal resource locator (URL) 20 and a registration number 22 which is written both in machine readable language and human readable language. The URL 20 is the internet address that is to be used for registration of the customer with respect to the goods and/or service to be provided as result of the purchase of kit 10. A magnetic strip 23 is also provided on card 18 which can also be read to provide information recorded thereon by an appropriate magnetic strip reader 19 such as disclosed in FIG. 4 discussed later herein. The recorded information can include information relating the goods and/or services purchased and/or any other information provided therewith that may be useful to the customer or other parties involved in providing the related goods and/or services.

The kit 10 in the particular embodiment illustrated is also provided with an image storage device 24 upon which images may be digitally stored. In the particular embodiment illustrated the image storage device 24 is a compact disk (CD) which is capable of storing a plurality of digital images. The image storage device 24 may be provided with a label 26 which can include all or some of the information provided on registration card 18 and/or the related goods and/or services to be provided. In the particular embodiment illustrated the label 26 is provided with registration number 22 provided on registration card 18. The CD is provided with a computer software program which when loaded on a computer will allow a user to communicate to a network photoservice provider 34 and also allow a customer to register the image retaining device 12 to the customer. The software may also allow the customer to do other tasks with the network photoservice provider 34. For example, but not limited to, the manipulation and/or sorting of digital images stored at the network photoservice provider 34, the uploading of images, the downloading of images, the ordering of goods and/or services and registration of additional image retaining devices 12 to the customer.

The image storage device 24, in the embodiment illustrated is capable of providing long term storage of the images that have been captured and stored on image retaining device 12. In this regard, the registration card 18 can also be used in identifying additional images obtained from other image retaining devices 12 that are to be associated and stored on image storage device 24.

Figure 2:
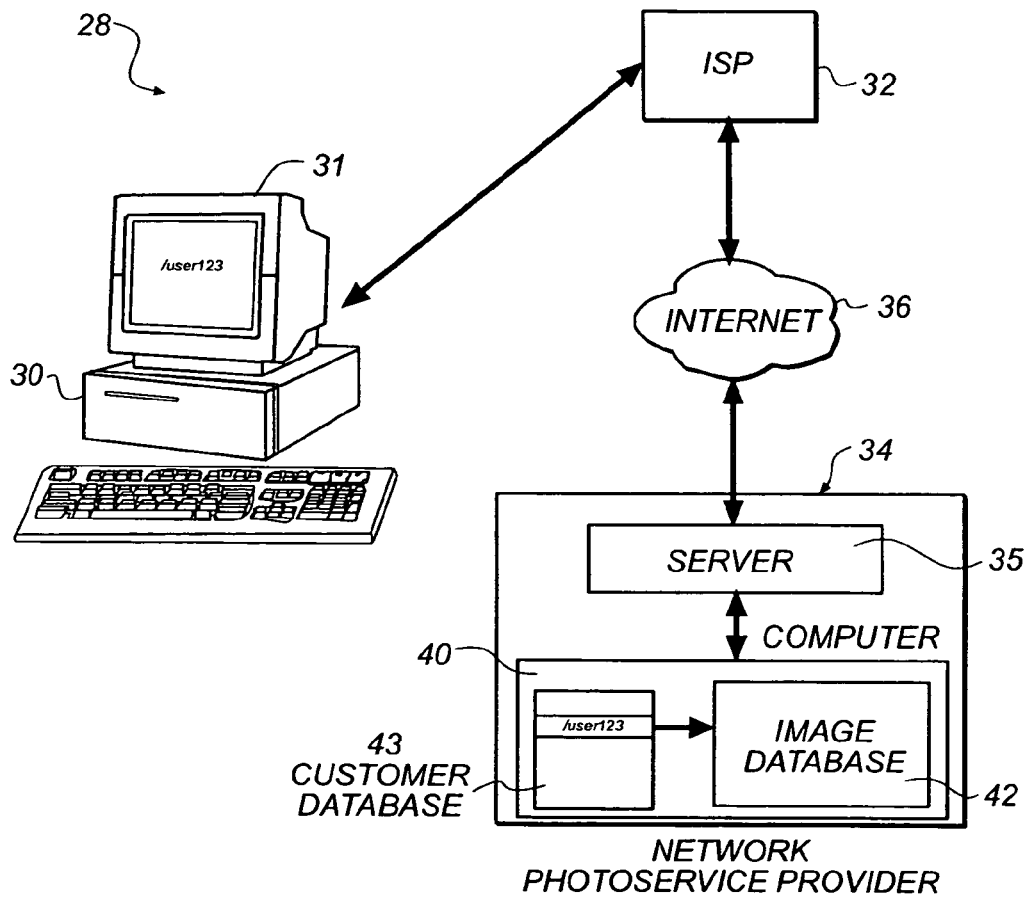
FIG. 2 is a schematic diagram of system made in accordance with the present invention.

Referring to FIG. 2 there is illustrated a block diagram showing an image organizing and automatic product delivery network system 28 that may be used for registering of kit 10 so that the appropriate goods and/or services will be automatically provided to the customer. In particular, the network system 28 comprises a computer 30 which can be linked to an Internet service provider (ISP) 32 which allows the computer 30 to be connected to a network photoservice provider 34 through the Internet 36. The computer 30 includes a display device 31 for displaying of images. In the embodiment illustrated display device 31 is a CRT, however, display device 31 may comprise any appropriate display device. In the particular embodiment illustrated the computer 30 is personal computer owned by the customer, however the present invention is not so limited. The computer 30 may comprise a kiosk and/or other computer that is available to the customer which can be connected to the network photoservice provider 34 through Internet 36 or other communication system.

The network photoservice provider 34 has a server 35 which is capable of communicating using the Internet 36 and which is connected to a computer 40. Computer 40 includes an image storage database 42 where customer images are stored and a management section (customer database 43) for managing customer orders and keeping track of the stored images.

The kit 10 may be sold as part of a particular promotion for providing a particular goods and/or service services upon reaching a predetermined criteria. In the particular embodiment illustrated, the kit 10 is sold with a promotion for providing an image storage product containing a plurality of images taken over a pre-selected period of time from a plurality rolls (strips) of photographic film 16. For example, a CD will be provided of a plurality of images taken over a defined number of different rolls of photographic film and/or which have been taken over the course of a single year. The cost of the goods and/or service may be prepaid with the cost of the kit 10. In system 28 the customer would first register for the particular goods and/or service sold as part of the kit 10. This is accomplished by the customer accessing the URL 20 provided on registration card 18 using computer 30 via the Internet 36. Once the customer is connected to network photoservice provider 34 associated with the URL 20, the network photoservice provider 34 will cause a registration screen 37 to be displayed on display device 31 of computer 30 as illustrated in FIG. 3*a*. As can be seen, the registration screen 37 will have various places for providing of appropriate information needed by the network photoservice provider 34. In particular, the registration screen 37 includes a section 48 for entry of the customer name, a section 49 for entry of the customer address, a section 50 for entry of the customer phone number, a section 52 for entry of the e-mail address for the customer, and a section 54 for entry of registration number 22. In the particular embodiment illustrated since this registration number is associated with kit 10, it is possible that the film cartridge ID 17 can be automatically associated with registration number 22. For example, in preparation and selling of the kit 10, the registration number 22 may already have been associated with the film ID and forwarded on to the network photoservice provider 34 by the packager of kit 10, which may be for example the manufacturer of one of the components of the kit 10 or by the retailer of the kit 10. However, in cases where the registration number 22 has not been pre-stored at the network photoservice provider 34, an additional section 56 may be provided on screen 37 for entry of the film cartridge ID 17.

Figure 3C:
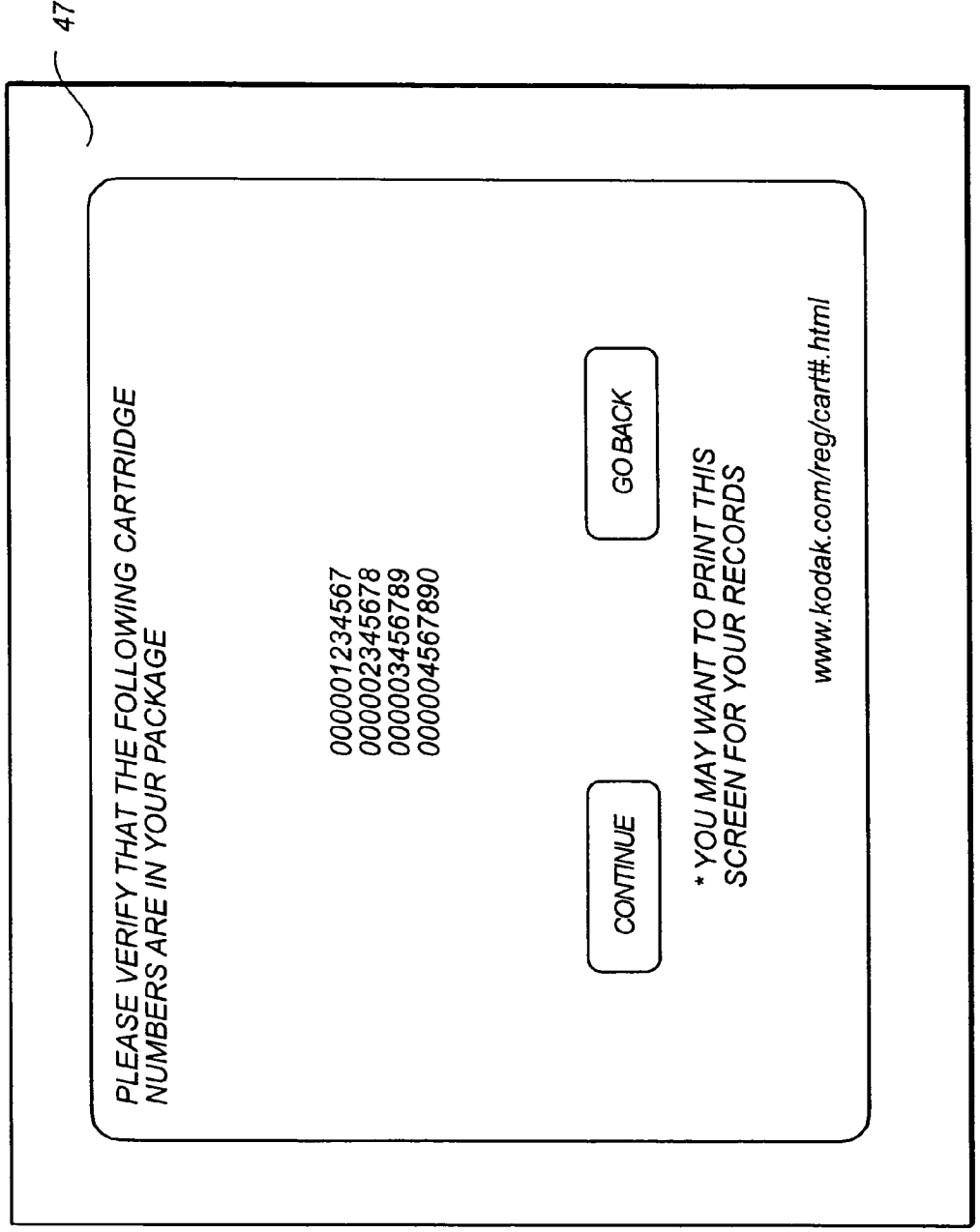
FIG. 3c is a diagram of an order screen on a display device of a computer that is used in the system of FIG. 2.

Referring to FIGS. 3*b*–3*c* there is illustrated a confirmation screen 46 and verification screen 47 that is provided to the customer after receipt and acceptance of the filled registration screen illustrated in FIG. 3*a*. Once the registration screen 37 has been completed the customer need not do anything further. This is because the kit 10 has already been pre-defined to provide a predetermined goods and/or service upon reaching a predetermined criteria. As previously discussed, in the embodiment illustrated, the kit 10 is designed to provide a plurality of images on a CD. Thus, when an appropriate number of image retaining devices 12 have been provided so as to obtain the required number of images for filling the CD, the CD will automatically be provided to the customer. Since the customer address has already been registered the completed CD is simply shipped to the customer by any desired means, for example, by mail, carrier, etc. Alternatively, the CD, or other goods or services, may be provided after a predetermined time period has elapsed. For example, the CD would be returned to the customer with all images that have been received within a one year time period. It is of course understood that the predetermined criteria may be selected as desired by the network photoservice provider 34 or selected by the customer at registration or at any other time prior to delivery of the requested goods and/or services. The customer is not limited to the particular goods and/or services that is associated with kit 10.

Referring to FIG. 3*d*, there is illustrated a goods/service order confirmation display screen 39. If goods and/or service have already been associated with the registration number 22, this will be seen on display screen 39. This screen also allows the customer to ask for additional goods and/or services or change the current order to provide different goods and/or services. As can be seen a variety of goods and/or services may be requested by the customer, for example, but not by way of limitation, ordering of album pages, providing the image on a computer disc, forwarding images to the KODAK PhotoNet™ Online service for forwarding images and/or goods to third parties, such as friends, relatives, business associates, create a site event where images from third parities may be shared. There, of course may be an additional cost associated with order changes made by the customer. As also illustrated on screen 37, there may be provided a place for a credit card number against which these new or modified goods and/or services may be charged thereby allowing the customer to be automatically billed for the goods and/or services requested. In the particular embodiment illustrated the cost of the kit 10 included the cost of providing the fulfilled CD in which case the customer would be charged only for additional goods and/or services requested.

Once the customer has completed the registration process, the customer may add additional image retaining devices 12 to the associated goods and/or service by simply reconnecting, via the internet, to the network photoservice provider 34 and providing additional film cartridge IDs 17 in the appropriate section 56 as prompted by the computer screen 37. If the customer desires, these additional film cartridges or other image retaining devices may be ordered through the network photoservice provider 34. When such orders are made, the ID for each of the additional devices can be automatically registered on behalf of the customer. Thus, all the image retaining devices 12 that are to be used for the providing of images on to CD are pre-registered prior to forwarding on to a photofinisher for developing of the images on the image retaining device 12 and for providing any additional services as required by the kit 10. As discussed later herein, the photofinisher 68 would contact the network photoservice provider 34 and access the customer information data section 44 of computer 40 to first determine if the film cartridge 14 has been registered and what goods or services have been requested through registration. In this regard, it may be possible that a special code be provided on the film cartridge 14 and/or photoprocessing envelope 70 advising that a network photoservice has been associated with the particular film cartridge 14. Otherwise, the photofinisher 68 can simply scan the film cartridge ID 17 number and determine whether or not a network photoservice product or service has been registered by the customer.

Figure 4:
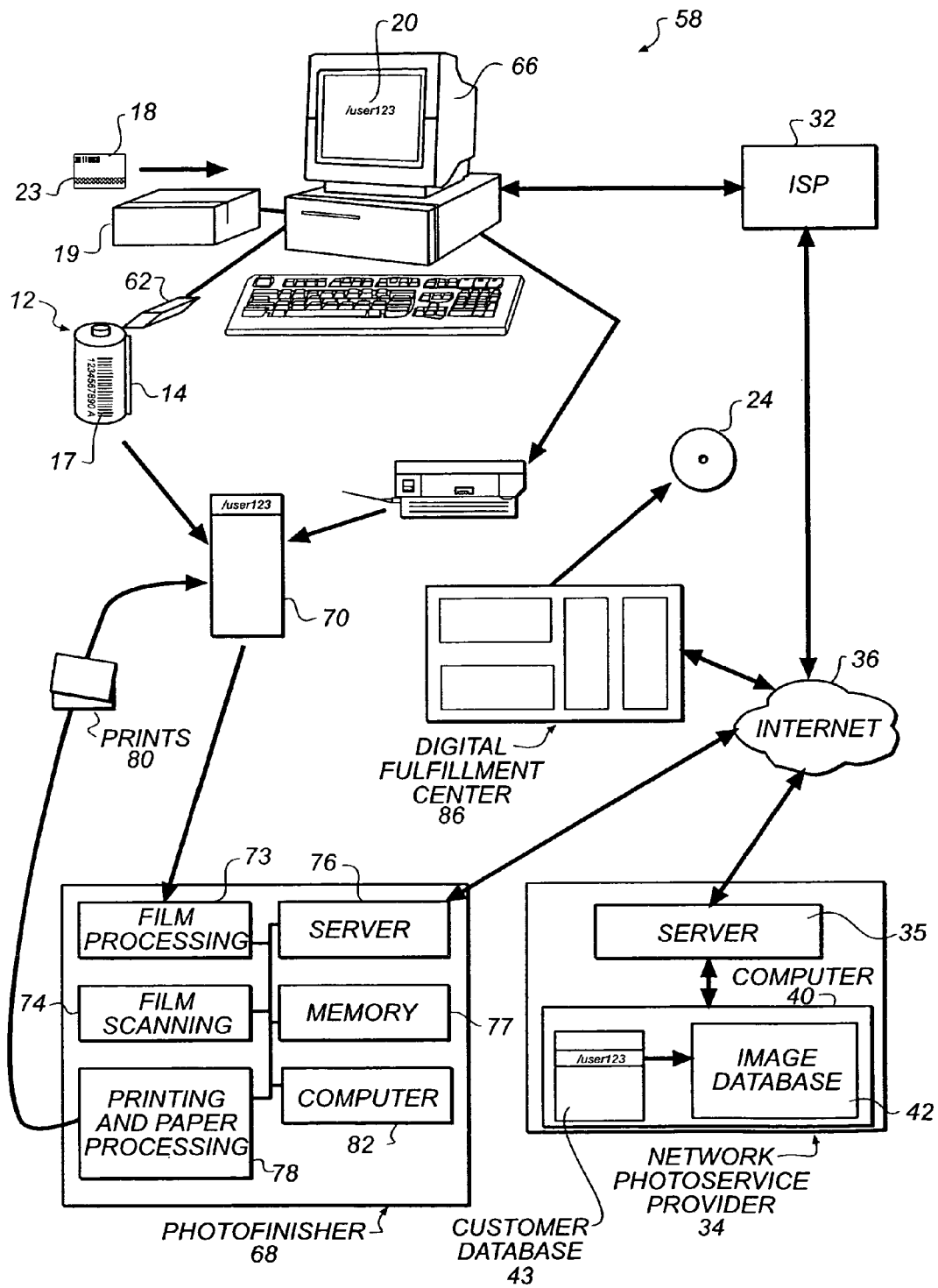
FIG. 4 is a schematic diagram of another system made in accordance with the present invention.

Referring to FIG. 4, there is illustrated a block diagram showing a modified network system 58 used in practicing the present invention. System 58 is similar to system 28 wherein like numerals indicate like parts and operation. As previously discussed, the kit 10 provides a single image retaining device 12 that is to be associated with the goods and/or service to be provided. A plurality of different image retaining devices 12 may be associated with a single goods and/or services in which case successive image retaining devices 12 must be associated therewith. With regard to system 58, a customer would use the registration card 18 to associate additional image retaining devices 12. When purchasing a second or subsequence image retaining device 12 as illustrated in FIG. 4, the film cartridge 14 may be scanned by scanner 62 at the retail establishment for obtaining the film cartridge ID 17. Also, a second scanner 19 may be provided for scanning the registration card 18 which will allow the customer to be automatically associated with that roll of film and registering of the film with that customer. This information would be forwarded by a retail computer 66 to an Internet service provider 32 which in turn would forward the information through the Internet 36 to the network service provider 34. The URL 20 address may be obtained from the scanning of the registration card 18. Since there is already an existing file associated with the registration number 22, the network photoservice provider 34 would automatically associate the film cartridge 14 with the service requested by the customer. The customer would then capture the appropriate images on image retaining device 12 and forward it to the appropriate photofinisher 68 in a typical photoprocessing envelope 70 whereby appropriate prints of any images captured on the image retaining device 12 may be returned to the customer as is typically done. The photofinisher 68 will have appropriate equipment 73 for processing of the image retaining device 12 and digitally scanning of the images, for example, by scanner 74. The scanned digital information of the images (digital images) is forwarded to photofinishing server 76 and to memory 77 for temporary storage. Then the digital images are sent to a printer 78 for producing of hard copy prints 80 as ordered by the customer. The photofinisher 68 will have an appropriate computer 82 for communicating with the server 76 which can communicate through the Internet 36 to network photoservice provider 34. As previously discussed, appropriate information is provided for obtaining the film cartridge ID 17 which can be identified by the network photoservice provider 34. Thus, if the customer presents an order that requires a particular service (i.e. such as providing images taken on a plurality of films 16 over a course of time, as previously discussed) the images will be sent via the Internet 36 to network photoservice provider 34 for storage and for providing of appropriate products or services as required upon reaching the predetermined criteria. In the particular embodiment illustrated, the predetermined criteria is the providing of sufficient images to fill the CD or upon expiration of the one year time period. Therefore, once the network photoservice provider 34 obtains enough images for fulfilling of the request of goods and/or services, a CD containing all the images will be automatically produced and forwarded to the customer. The actual production of the CD may be accomplished by any appropriate concern. In the particular embodiment illustrated the network photoservice provider 34 sends the appropriate information to a fulfillment center 86 which will produce the appropriate CD as required. In the particular embodiment illustrated an image storage device 24 in the form of a CD is provided to the customer at initial purchase. The CD is provided with appropriate computer software, as previously discussed. Also in the embodiment illustrated, the initial CD supplied with kit 10 was sent to the photofinisher 68 in the photoprocessing envelope 70. The supplied CD can be forwarded on to the fulfillment center 86 once where the customer order is fulfilled. It is not necessary that the CD initially supplied be the actual CD used to fulfill the customer order or that the kit 10 be supplied with a CD for providing the desired goods or service. If desired, the kit 10 may simply state that a CD or other desired goods or service will be provided upon proper registration.

In the particular embodiment illustrated, the CD will typically hold approximately 500 high resolution digital images obtained from about 20 rolls of photographic film, each containing approximately 24 images. Thus, when 20 rolls have been processed, the images that have been stored at the network photoservice provider 34, the appropriate customer order information and associated digital images are forwarded on to the appropriate fulfillment center 86 for completion of the customer order.

In the particular embodiment illustrated, the predetermined criteria for providing of the CD is based on a particular number of images being provided by the customer. However, the present invention is not limited to such. For example, if only five rolls of films are processed within a prescribed time period, for example one year, upon reaching the prescribed time period a CD will be produced with whatever images have been obtained for that time period and will be forwarded automatically to the customer. It is, of course, understood that any predetermined criteria may be used. The particular criteria may be modified by the customer at the time of registration or at any time prior to producing of the CD. The customer can, of course, order any further modification or additional selections for goods and/or services which may or may not result in a charge to the customer.

Figure 5:
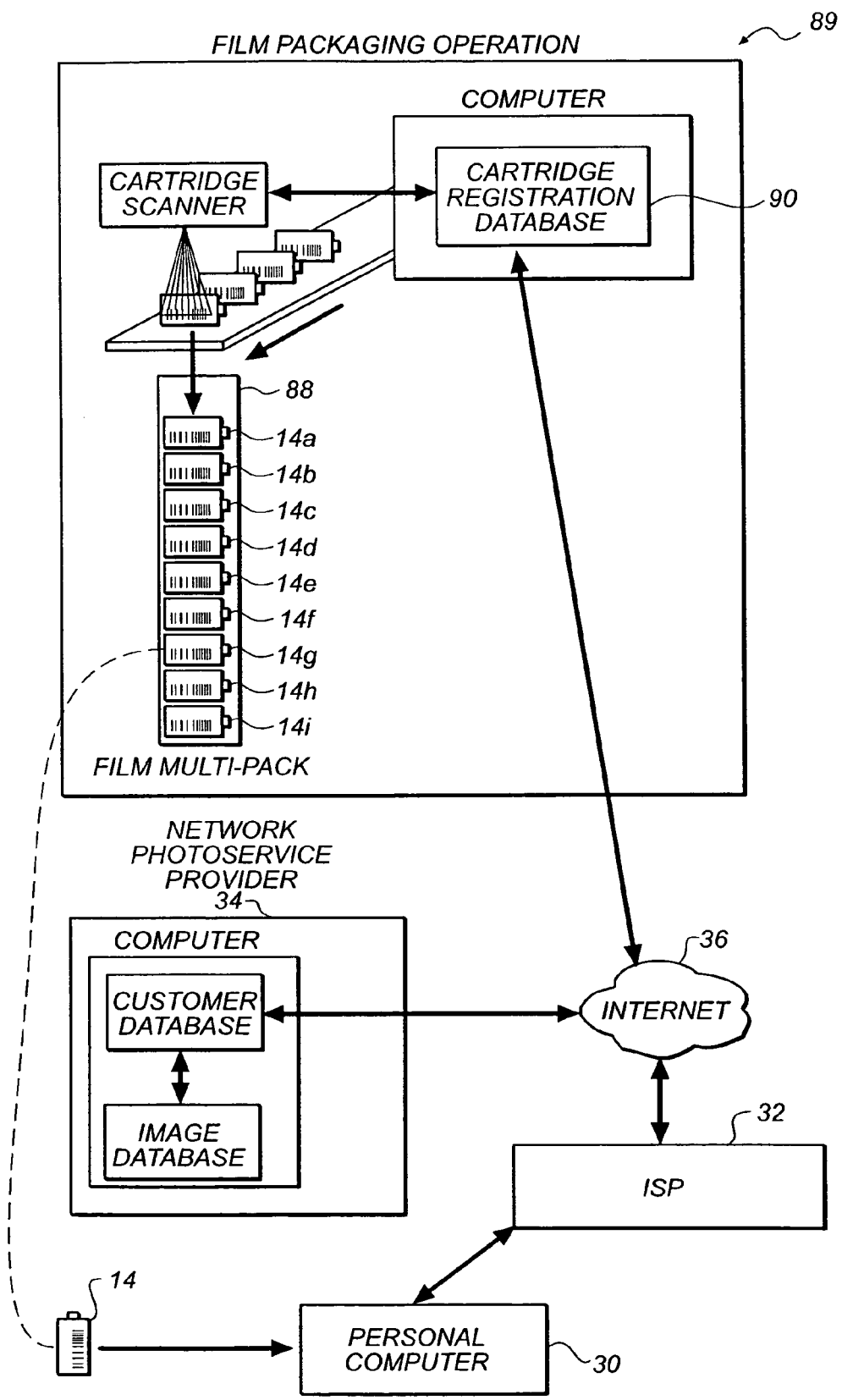
FIG. 5 is a schematic diagram of yet another system made in accordance with the present invention.

In the invention illustrated in FIG. 1, only one image retaining device 12 is provided in kit 10 for starting of the process. However, the present invention is not so limited. Referring to FIG. 5, there is illustrated a block diagram of a system 89 also made in accordance with the present invention. In this embodiment a plurality of film cartridges 14a–14i are provided in a single package 88 as illustrated. Each of the film cartridges 14a–14i are scanned prior to being filled in package 88 so as to obtain the cartridge ID 17 for each of the film cartridges 14. This information is forwarded to a cartridge registration database 90, wherein the information regarding the cartridge ID 17 for each of the film cartridges 14 placed in package 88 are identified and grouped as a set. The cartridge registration database 90 is accessible through the Internet 36 or other types of communication to the network photoservice provider 34 and to a personal computer 30 of a customer. System 89 operates much in the same way as system 58 described with respect to FIG. 4 like numerals indicating like parts and operation. In system 89, all of film retaining devices 12 within the package 88 can be readily identified by identifying only one of the film cartridges 14 as this information was originally captured as a group. Thus, when all of the film cartridges 14 in package 88 have been sent to the photofinisher 68 for processing and the captured images forwarded to the network photoservice provider 34, a CD containing all of the captured images will be automatically provided by the network photoservice provider 34. In this regard the network photoservice provider 34 would send the stored digital images and customer order directions to a fulfillment center (not shown) where the appropriate goods and/or services are made and sent to the customer. The registration process works much in the same way as previously discussed, however, instead of having the customer registering all of the film cartridges 14 individually, the customer need only provide one ID. Confirmation will be provided by the network photoservice provider 34 with respect to the other film cartridges 14 that are associated therewith as being part of the same group. The customer could then confirm that the actual film cartridges 14 contained in package 88 correspond to the confirmation notice provided by the network photoservice provider 34 to the customer.

While the entire group of film cartridges 14 will be considered a single set, the customer could modify the grouping at registration, or at some later time, by partitioning certain film cartridges 14 to a particular goods or service. For example, but not by way of limitation, the customer could indicate that the images obtained from film cartridges 14a, 14b and 14c are to be provided as a single group and are to be delivered on a single CD whereas the images from film cartridges 14d, 14e, 14f and 14g are provided on a second CD, and the images obtained from film cartridges 14h and 14i are to be provided on a single computer disk. It is of course to be understood that the customer may select any desired goods and/or service to be associated with any particular grouping or individual film cartridge 14.

Figure 6:
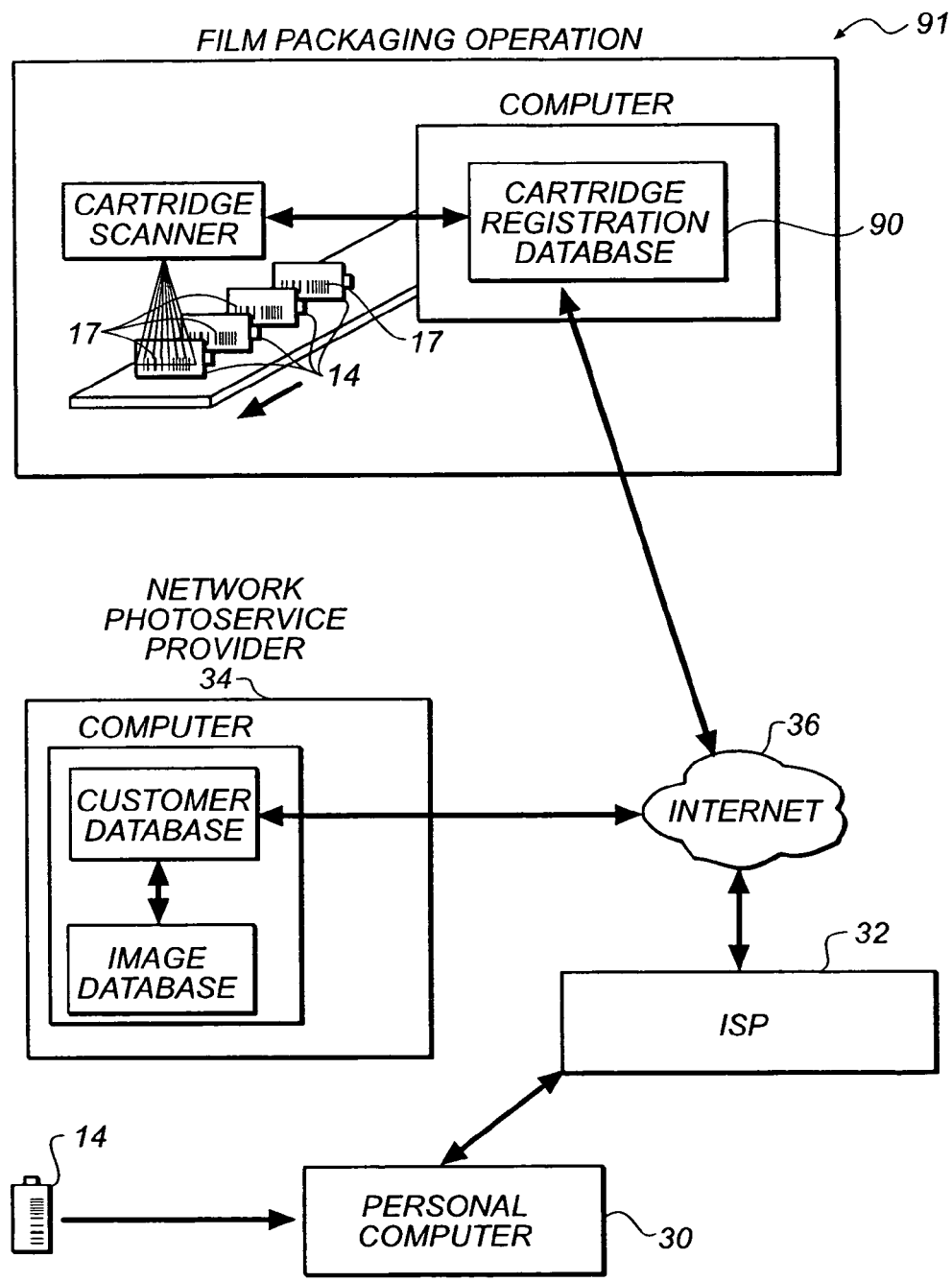
FIG. 6 is a schematic diagram of still another system made in accordance with the present invention.

Referring to FIG. 6, it is illustrated a block diagram of modified system 91 made in accordance with the present invention. The system 91 of FIG. 6 is very similar to system 89 of FIG. 5 except that the individual film cartridges 14 are not provided in a group packaging. The image retaining devices 12, in this embodiment are individually sold and are grouped as selected by the customer.

Figure 7:
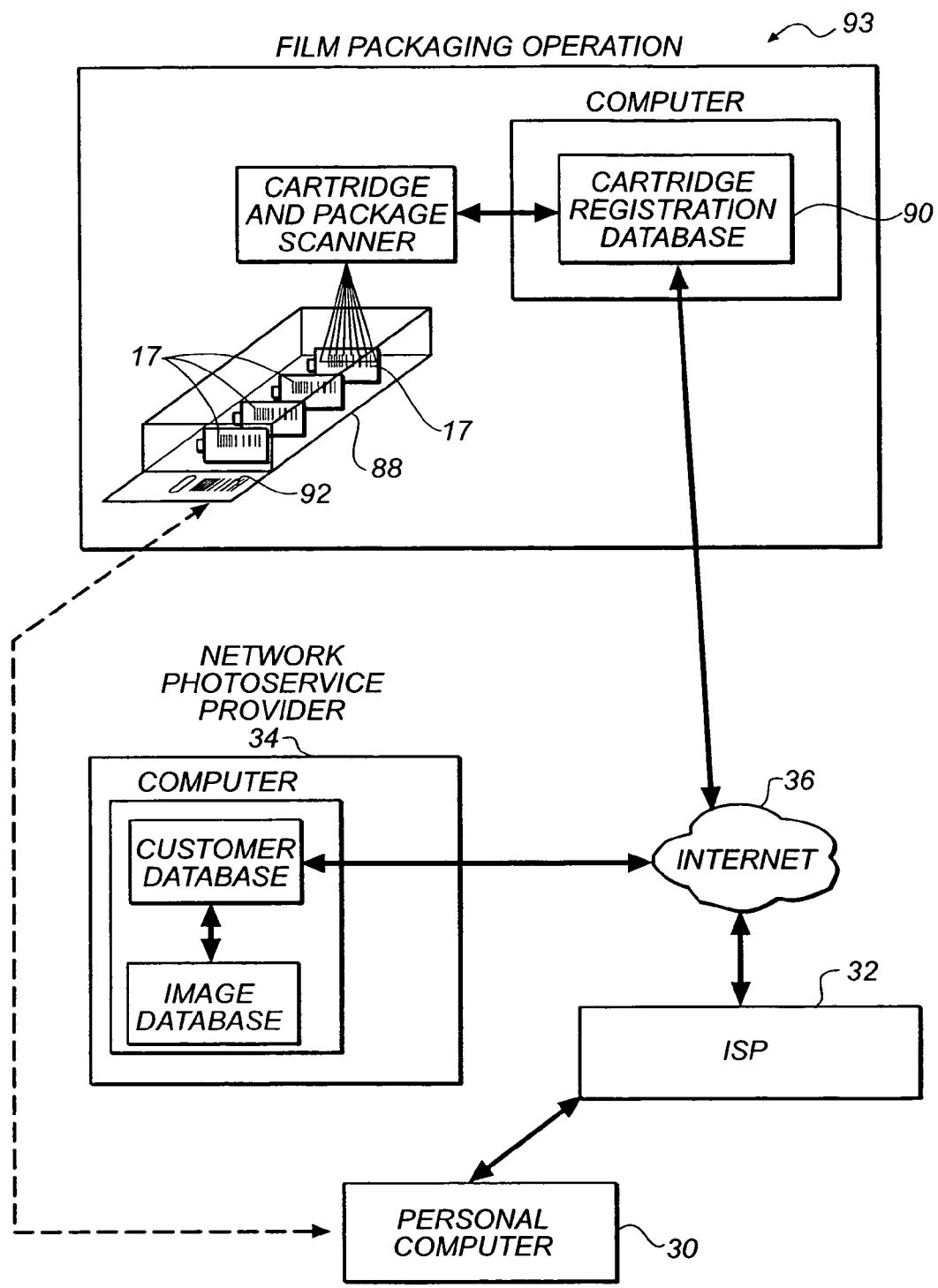
FIG. 7 is a schematic diagram of another system made in accordance with the present invention.

Referring to FIG. 7 there is illustrated a block diagram of yet another modified system 93 made in accordance with the present invention. The system 93 of FIG. 6 is similar to that of FIG. 4 except that an additional machine readable package ID 92 is provided on the package 88 for identifying all of the film cartridges 14 provided in the package 88. In this embodiment the cartridge ID 17 is scanned when the film cartridges 14 are in package 88. The scanned information, the cartridge ID 17 for all of the film cartridges 14 and the package ID 92, is sent on to the registration database 90 as previously discussed. Since there is provided a package ID 92 this can immediately associate all of the individual film cartridge ID 17 provided in package 88. Thus, when the customer registers the film, he need only provide the package ID 92 during registration wherein confirmation of all the individual film cartridges 14 will then again be provided to the customer confirming the actual cartridge IDs 17 of the film cartridges 14 provided to the customer. An advantage of system 93 is that the scanning and grouping of the individual film cartridges 14 may be provided at film packaging or at the retail establishment where the package 88 of film cartridges 14 are actually sold. Thus, the initial package 88 may not be part of an initial program by the film manufacturer or film packager but is entered into by the retailer. The remaining operation of system 93 would operate in the same manner as system 58 previously discussed.

Figure 8:
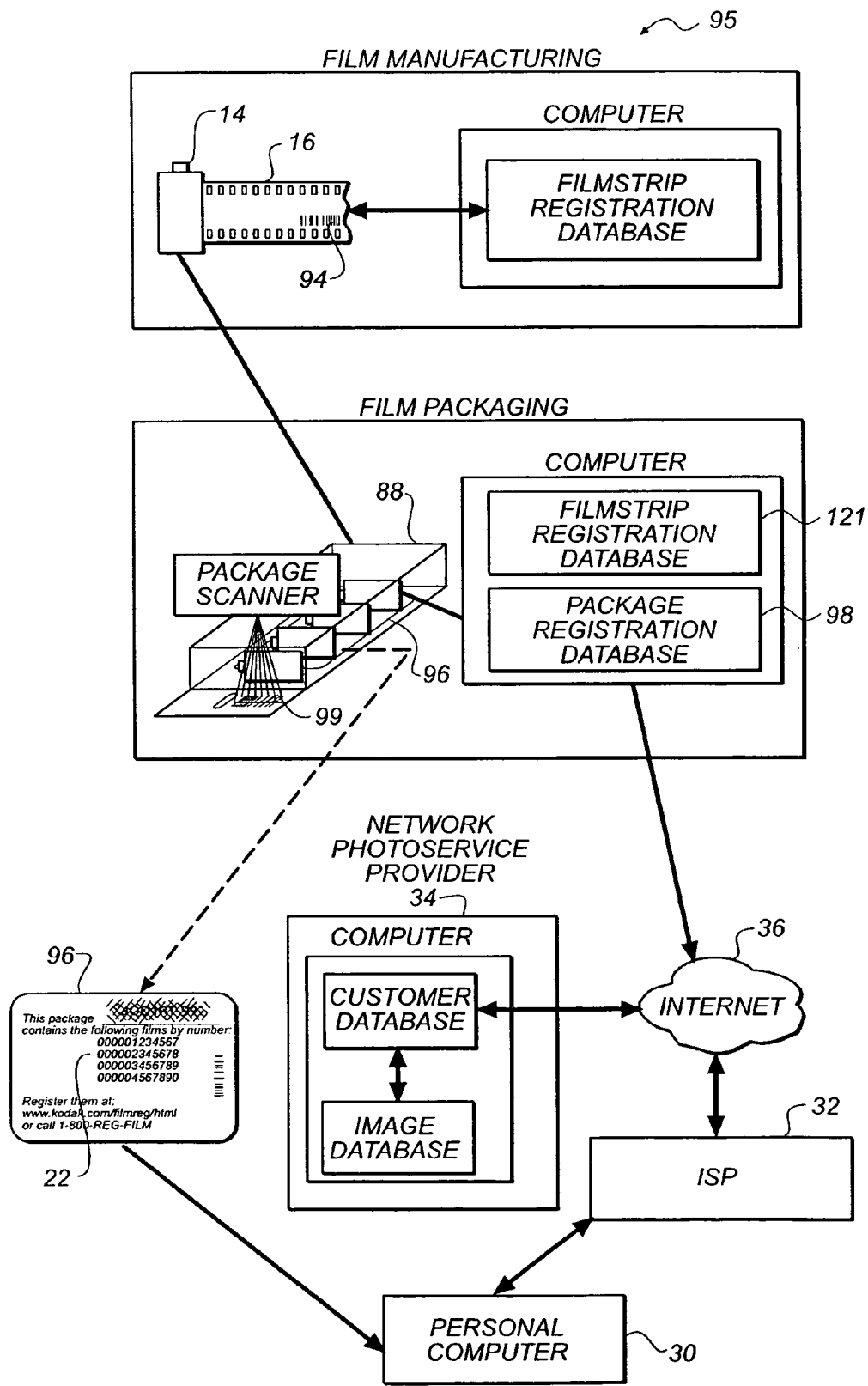
FIG. 8 is a schematic diagram of yet another system made in accordance with the present invention.
Figure 9A:
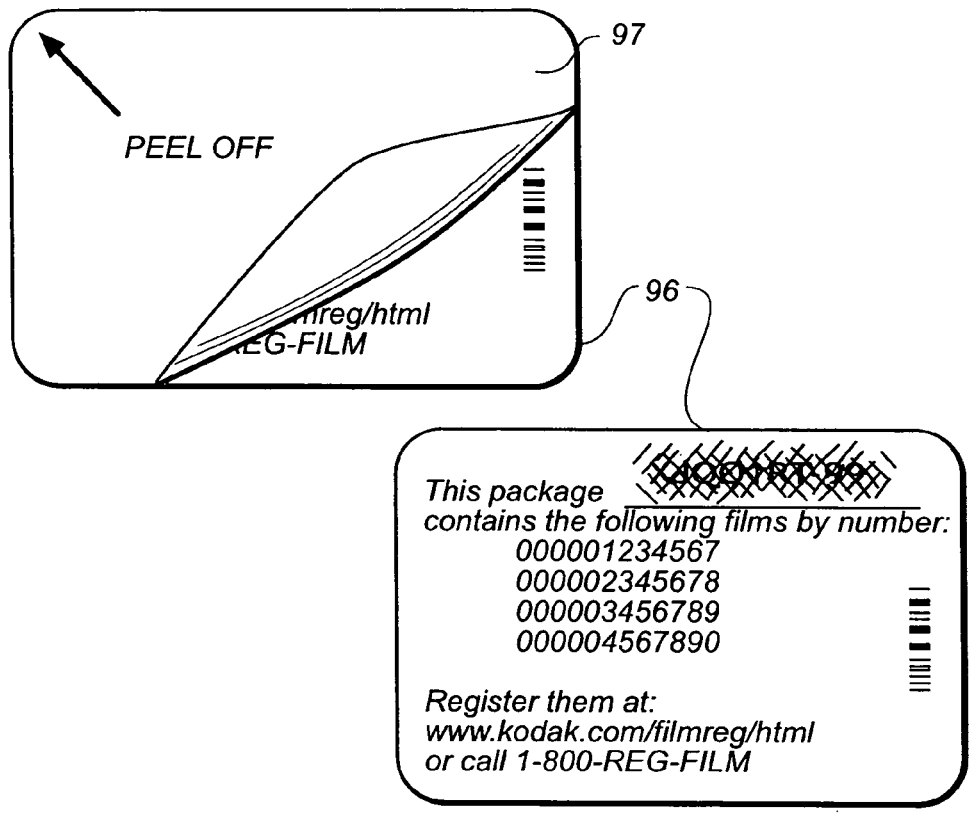
FIGS. 9a–9b illustrate a registration card to be used in the system of FIG. 8.
Figure 9B:
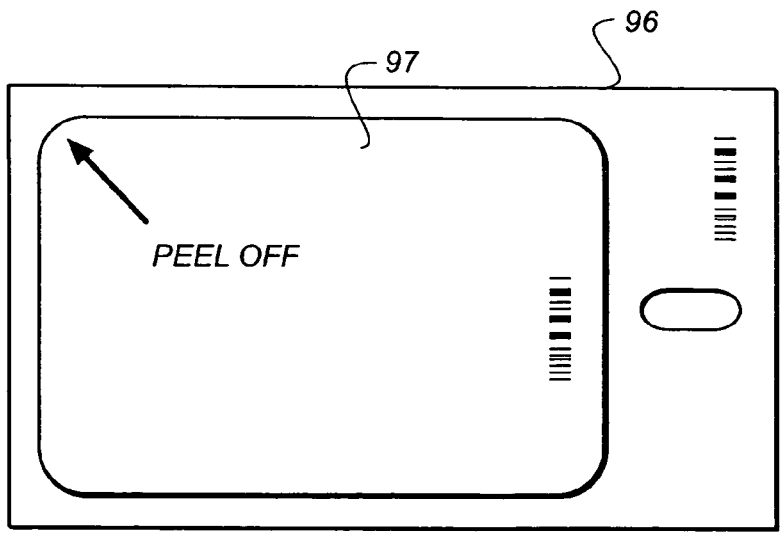
Figure 11A:
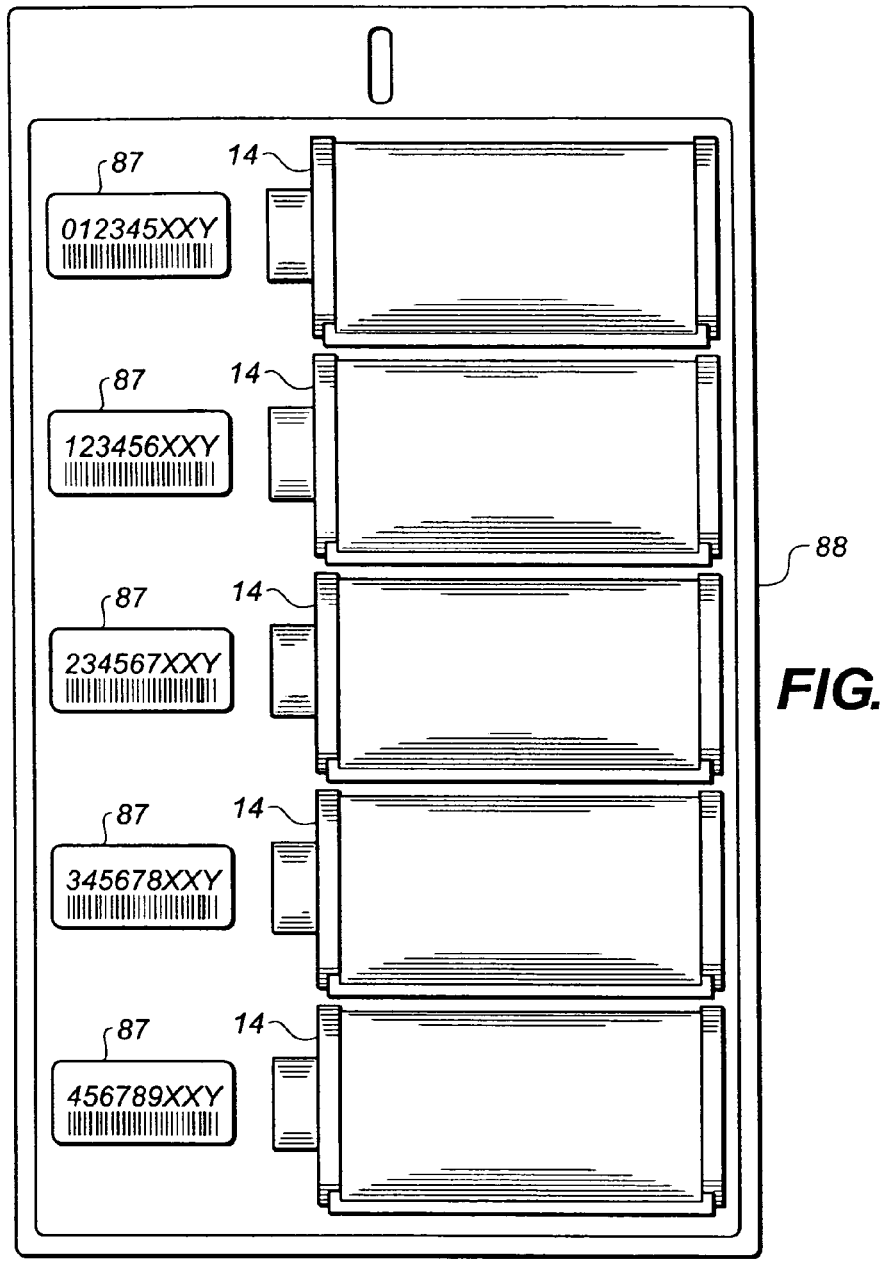
FIG. 11a is a plan view of a package for holding image retaining devices made in accordance with the present invention.
Figure 11B:
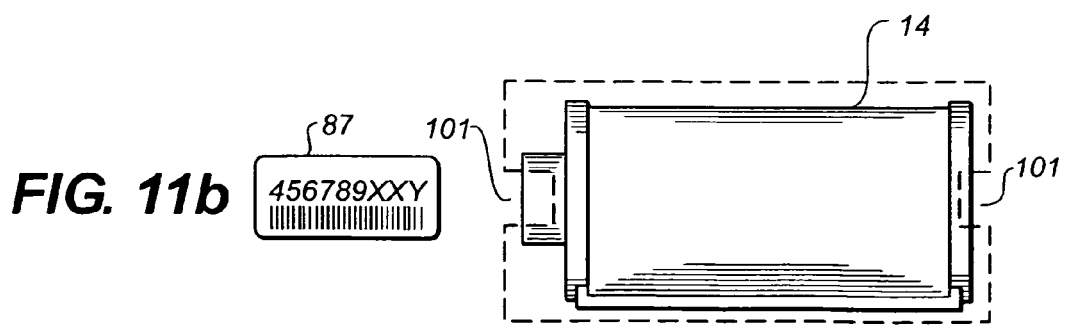
FIG. 11b is an enlarged partial view of the package of FIG. 11a illustrating how the individual image retaining device may be held therein.

Referring to FIG. 8 there is illustrated a block diagram in yet of another modified system 95 made in accordance to the present invention. Like numerals indicating like parts and operation previously discussed. In this embodiment, a film ID 94 is provided on film 16. This information would be provided by the film manufacturer and sent to film registration database 121 which in turn would be sent to a package registration database 98 at a network photoservice provider 34. A card 96 could also be provided in the package 88 identifying the film ID 94 for of all the film cartridges 14 placed within package 88. This would allow the retailer to scan the card 96 and forward the information on to the network photoservice provider 34. Package ID 99 would be scanned and provided to the package registration database 98. This system would be useful when the film cartridge 14 does not have a registration number printed on the cartridge, such as with 35 mm film. It is known in the film manufacturing art to write a latent image barcode onto the filmstrip of a 35 mm roll of film during the manufacturing process. Such a barcode can encode the numbers subsequently used to register the film cartridges 14. When submitted for processing, the developed film 16 can be read by scanner 74 and cross checked against film registration database 121 to determine the appropriate goods and/or services selected. When the customer receives the package 88, he would register the film cartridges 14 by entering the numbers set forth on the card 96 that is provided in the package 88. Then registration service would be provided in much the same manner as previously discussed. While in the particular embodiment illustrated in FIG. 8, the registration is accomplished by the customer at a personal computer 30, this can be done alternatively by a retail establishment wherein the card 96 is provided within package 88 with a peel off label 97 such as illustrated in FIGS. 9a–9b. In the particular embodiment illustrated, a conventional laser is used to write the registration number 22 on the card 18 through the peel off label 97. The laser will not damage the peel off label 97, but will write on the card 96 as the material of card 96 absorbs the energy of the laser to form human readable text using a well known technique. Once the peel off label 97 has been removed, for example, by the retailer and/or customer, this information could be entered by the retailer into the system and the card 96 be given or used by the customer for use in identifying the film cartridges 14 that has been entered into the systems. The particular goods and/or services can be entered at the time of registration by the retailer or if desired, on a photoprocessing envelope 70 that is provided with the order at the time of the processing film. Additionally there may be provided on package 88 as shown in FIG. 11a having peel off stickers 87 having the unique ID written in a machine readable form for each film cartridge 14. The back side of the stickers 87 have an adhesive surface for adhering the sticker to the associated film cartridge 14 or photoprocessing envelope 70 used to order processing of the film. Thus, the sticker 87 can be placed on the film cartridge 14 so the photofinisher 68 can automatically read the cartridge ID 17 and determine if it associated with a registered film cartridge 14 and the providing of a particular goods and/or service at the network photoservice provider 34 as previously discussed. FIG. 11b illustrates how the film cartridge 14 is mounted to package 88. In particular a pair of tabs 101 which can be easily torn to allow easy removal of film cartridge 14. As can be seen the cartridge ID 17 is placed adjacent the film cartridge 14 containing the strip of film 16 having the associated cartridge ID 17.

Figure 10:
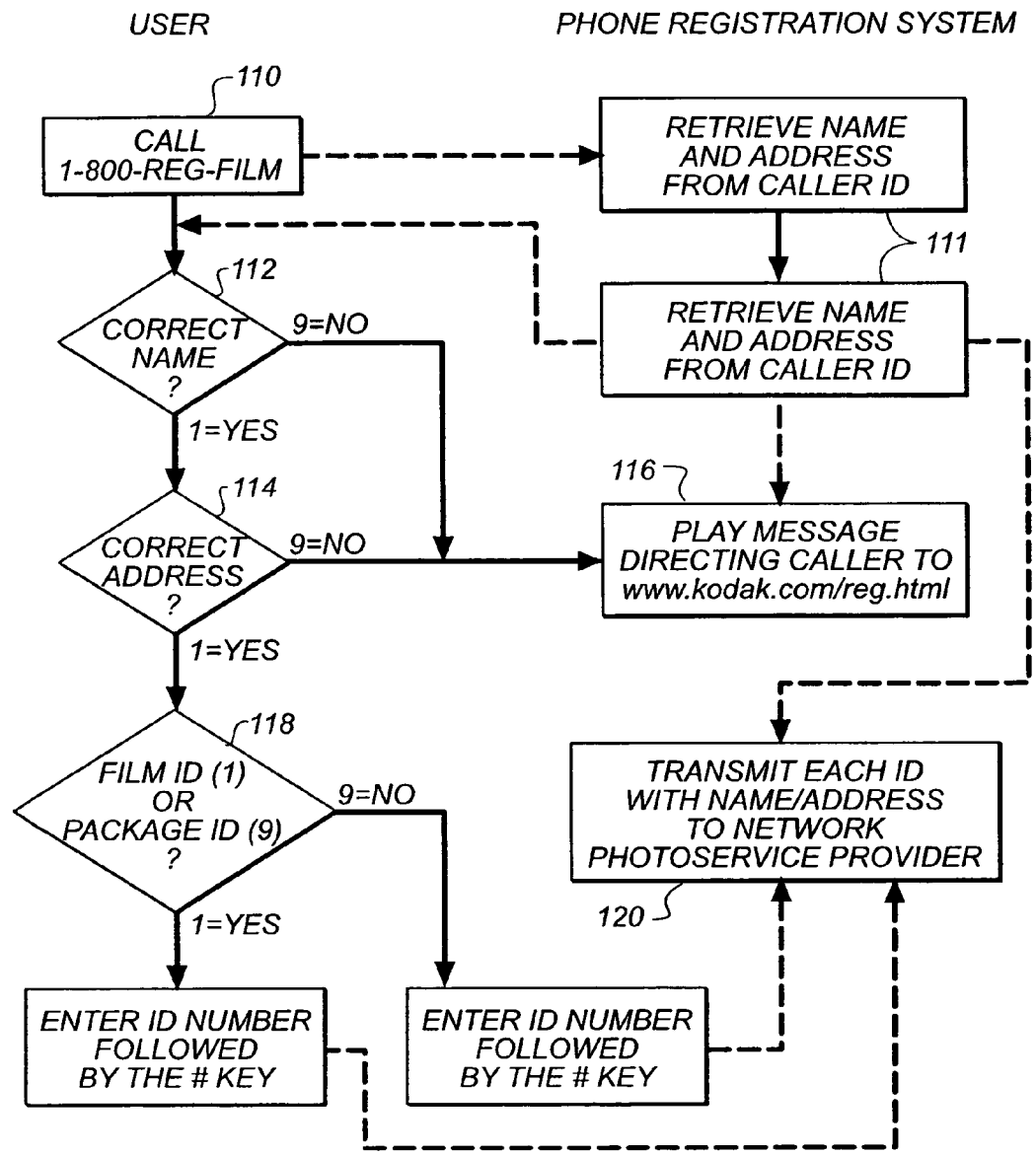
FIG. 10 is a plan view of a package containing a plurality of image retaining devices to be used in the system of FIG. 8

Upon registration with a network photoservice provider 34, a customer account is established. Once a customer account is, it is possible to order film directly whereby the film or other products can be automatically sent to the customer and automatically registered for a particular goods and/or services selected by the customer. Thus, for example, the customer need not do anything else other than ordering a film cartridge 14. Referring to FIG. 10, there is illustrated a form by which the film cartridge 14 could be ordered over the Internet 36 and wherein the customer would provide an account number associated with that particular customer. As can be seen, the particular film type and quantity desired may be provided. There also could be provided selections for automatically registering of this film cartridge 14 with the particular goods and/or services as previously discussed.

In the embodiments previously discussed, registration occurs by use of a personal computer 30 or similar type device. However, the present invention is not so limited. For example, registration by a customer may be accomplished by phone. All that need be provided is a phone number which may be provided on the package for goods and/or services whereby the customer can call and register a particular image retaining device 12. Referring to FIG. 10, there is illustrated a block diagram of the process by which phone registration may be accomplished. First, the customer at box 110 calls a registration service. The registration service at box 112 would then retrieve the name and address 111 using caller ID as is typically available today on many phone systems. If the caller ID is blocked out, a voice message would be provided to the customer to enter their account number if they have one using the phone touch pad. If the customer does not have registration number, a registration number will be assigned to the customer. Based on the previous registration, or from the caller ID, information will be provided to the customer to confirm that the name and address is correct at step 114. However, if the name and/or address is incorrect in either steps 112 and 114, the registration process will go to a step 116 where the correct information can be entered by the customer. This can be done by an operator or by punching in the appropriate information on the phone touch pad. Once having established the correct name and address at step 118 the customer would enter the cartridge ID 17 or package ID 92 as appropriately, by using the phone touch pad. Once registration by phone is complete, the collected information is transmitted to the network photoservice provider 34 at step 120. At any time during the operation should assistance be required, appropriate instructions will be provided so that the customer can talk to a live individual for assistance.

In the above description the image retaining device 12 is shown as a film cartridge 14, however the image may be provided in a variety of other formats, for example, from a digital camera, computer disc, flash card, and any other media capable of providing images which are in digital format or can be converted into a digital format.

The network photoservice provider 34 is illustrated as a separate facility, however the present is not so limited. The network photoservice provider may be a part of the photofinisher 68 and/or fulfillment center 86. Likewise the fulfillment center 86 may be part of the photofinisher 68 and/or network photoservice provider 34. It is important only that the functions provided by these providers be maintained.

In the detailed description, an ID is provided on the image retaining device or registration card. It is also possible to provide an ID on the image storage device 24, such as a CD. The manufacturer of the CD can register the ID with network photoservice provider 34. In one embodiment, the ID would be provided in the software on the CD that is used for communicating with the network photoservice provider 34. Thus, when the customer goes to the photonetwork service provider, the ID on the CD can be used to automatically register the customer and image retaining devices associated with the CD would also be automatically registered. When a package containing a plurality of image retaining device, such as film cartridges, are sold with a CD 24, the customer need only provide his or her name and address for registration. The customer may of course modify or change and goods and/or services that are to be provided.

It is to be understood that various changes and modifications may be made without departing from the scope of the present invention. The present invention being limited by the following claims.

PARTS LIST

| | | | |
|---|---|---|---|
| 10. | retail kit | 56. | auction |
| 12. | image retaining device | 62. | scanner |

-continued

PARTS LIST

| | | | |
|---|---|---|---|
| 14. | film cartridge | 66. | retail computer |
| 14a.–14i | film cartridges | 73. | equipment |
| 16. | film | 74. | scanner |
| 17. | film cartridge ID | 76. | server |
| 18. | registration card | 77. | memory |
| 19. | magnetic strip reader | 78. | printer |
| 20. | URL | 80. | hard copy prints |
| 22. | registration number | 82. | computer |
| 23. | magnetic strip | 86. | fulfillment center |
| 24. | image storage device | 87. | peel off stickers |
| 26. | label | 88. | package |
| 28. | network system | 89. | system |
| 30. | computer | 90. | cartridge registration database |
| 31. | display device | | |
| 32. | Internet service provider | 91. | system |
| 34. | network photoservice provider | 92. | package ID |
| 35. | server | 93. | system |
| 36. | Internet | 94. | film ID |
| 37. | registration screen | 95. | system |
| 39. | confirmation display screen | 96. | card |
| 40. | computer | 97. | peel off label |
| 42. | image database | 98. | package registration database |
| 43. | customer database | | |
| 46. | verification screen | 99. | package ID |
| 47. | verification screen | 101. | tabs |
| 48. | section | 110. | box |
| 49. | section | 111. | box |
| 50. | section | 112. | box |
| 52. | section | 114. | step |
| 54. | section | 116. | step |
| | | 118. | step |
| | | 120. | step |
| | | 121. | filmstrip registration database |

What is claimed is:

1. A method for automatically providing at least one goods and/or service by a service provider to a customer with respect to a plurality of customer provided images, comprising the steps of:

providing a database by said service provider for storing digital images with respect to a customer account associated with said customer that is accessible by said customer over a communication network;

providing at least one image on behalf of said customer to said service provider that is stored on said database and is associated with said customer account; and automatically providing a goods and/or service to a recipient designated by said customer incorporating said plurality of customer provided images stored on said database after reaching a predetermined criteria established with respect to said customer account prior to receipt of the images by said service provider that are required to provide said goods and/or service wherein said predetermined criteria is a predetermined time period.

2. A method according to claim 1 wherein said at least one image is obtained from scanning a first roll of photographic film.

3. A method according to claim 2 further comprising the step of providing a unique ID with respect to said first roll of photographic film.

4. A method according to claim 3 further comprising the step of registering said customer with respect to said unique ID that can be used in identifying said at least one image.

5. A method according to claim 4 further comprising the step of automatically providing a subsequent roll of photographic film in response to said service provider receiving said first roll of photographic film for development.

6. A method according to claim 1 further comprising the steps of allowing remote Internet access to said at least one image for review by said customer.

7. A method according to claim 6 further comprising the steps of providing computer software to said customer for allowing the customer to modify said at least one image prior to providing said goods and/or service.

8. A method for automatically providing at least one goods and/or service by a service provider to a customer with respect to a plurality of customer provided images, comprising the steps of:

providing a database by said service provider for storing said plurality of customer provided images in a digital format with respect to a customer account associated with said customer, said customer account having associated therewith a predetermined criteria selected by said customer for providing at least one goods and/or service with respect to images to be later received by said service provider for storage on said database;

providing to said service provider at least one image on behalf of said customer that is stored on said database and associated with said customer account; and automatically providing said at least one goods and/or service incorporating said plurality of customer provided images to a recipient designated by said customer after reaching said predetermined criteria established prior to receipt of the customer provided images required to provide said at least one goods and/or service wherein said predetermined criteria is a predetermined time period.

9. A method for automatically providing at least one goods and/or service by a service provider to a customer with respect to a plurality of customer provided images, comprising the steps of:

providing a database by said service provider for storing said plurality images in a digital format with respect to a customer account associated with said customer, said customer account having associated therewith a predetermined criteria selected by said customer for providing at least one goods and/or service with respect to customer provided images to be later received by said service provider for storage on said database;

providing to said service provider at least one image on behalf of said customer that is stored on said database and associated with said customer account; and automatically providing said at least one goods and/or service incorporating said plurality of customer provided images to a recipient designated by said customer after reaching said predetermined criteria established prior to receipt of the images required to provide said goods and/or service wherein said predetermined criteria is a predetermined number of images received from two or more sources.

10. A method for automatically providing at least one goods and/or service by a service provider to a customer with respect to a plurality of customer provided images, comprising the steps of:

providing a database by said service provider for storing digital images with respect to a customer account that is accessible by said customer over a communication network;

providing at least one image on behalf of said customer to said service provider that is stored on said database and is associated with said customer account; and automatically providing said at least one goods and/or service to a recipient designated by said customer incorporating said plurality of customer provided images stored on said database after reaching a predetermined criteria established with respect to said customer account prior to receipt of the customer provided images by said service provider that are required to provide said at least one goods and/or service wherein said predetermined criteria is a predetermined number of images received from two or more sources.

11. A method according to claim 10 wherein said at least one image is obtained from scanning a first roll of photographic film.

12. A method according to claim 11 further comprising the step of providing a unique ID with respect to said first roll of photographic film.

13. A method according to claim 12 further comprising the step of registering said customer with respect to said unique ID that can be used in identifying at least one image.

14. A method according to claim 13 further comprising the step of automatically providing a subsequent roll of photographic film in response to said service provider receiving said first roll of photographic film for development.

15. A method according to claim 10 further comprising the steps of allowing remote Internet access to one or more customer provided images for review by said customer.

* * * * *